United States Patent [19]

Gérard et al.

[11] Patent Number: 4,475,633

[45] Date of Patent: Oct. 9, 1984

[54] DISC BRAKE INCLUDING A MOVABLE ASSEMBLY

[75] Inventors: Jean-Louis Gérard, Paris; Claude Le Marchand, Domont, both of France

[73] Assignee: Societe Anonyme DBA, Paris, France

[21] Appl. No.: 407,388

[22] Filed: Aug. 12, 1982

[30] Foreign Application Priority Data

Sep. 28, 1981 [FR] France .................. 81 18216

[51] Int. Cl.³ .................................... F16D 55/224
[52] U.S. Cl. ........................... 188/73.45; 188/73.44; 411/193
[58] Field of Search ............. 188/73.44, 73.45; 411/531, 546, 534, 85, 90, 91, 93, 96, 193-196, 134, 135, 533; 24/230 AK, 241 SB, 573, 588, 653

[56] References Cited

U.S. PATENT DOCUMENTS 1,582,094  4/1926  Sweet ................................ 411/193
4,034,857  7/1977  Kondo et al. ..................... 188/73.45

FOREIGN PATENT DOCUMENTS 2651539  5/1977  Fed. Rep. of Germany ... 188/73.45
2653860  6/1977  Fed. Rep. of Germany ... 188/73.45
2334012  12/1977  France .
2436286  4/1980  France .

Primary Examiner—Duane A. Reger
Assistant Examiner—Alvin Oberley
Attorney, Agent, or Firm—Larry J. Palguta; Paul D. Schoenle; Ken C. Decker

[57] ABSTRACT

The subject of the invention is a disc brake including a movable assembly. The brake includes a movable assembly (10) mounted to slide by two small columns (12, 14) on a fixed support (16). The small columns include a cylindrical sleeve and a screw. A locking element (66) is interposed between the sleeves and the heads (62) of the corresponding screws. The locking element has two forks (70) each engaging in a groove formed in each of the sleeves and also a resilient portion (74) which locks the locking element (66) onto said sleeves by interference with a portion of said sleeves located between said groove and the corresponding end of the sleeve, so as to make the locking element (66) completely secure and prevent rotation of the sleeves when the screws are screwed in. The brake may be utilized for the braking of motor vehicles.

3 Claims, 6 Drawing Figures

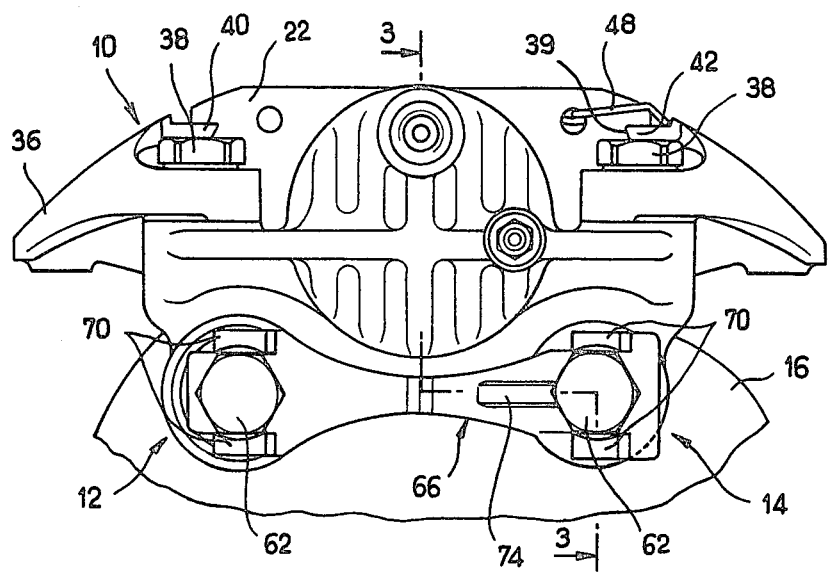
FIG_1
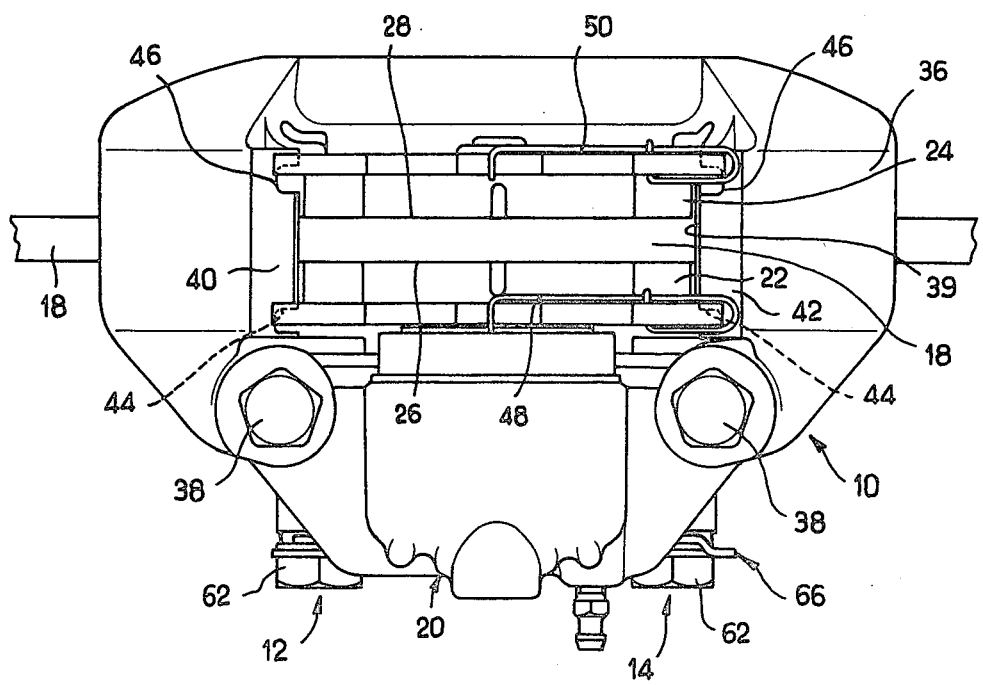
FIG_2

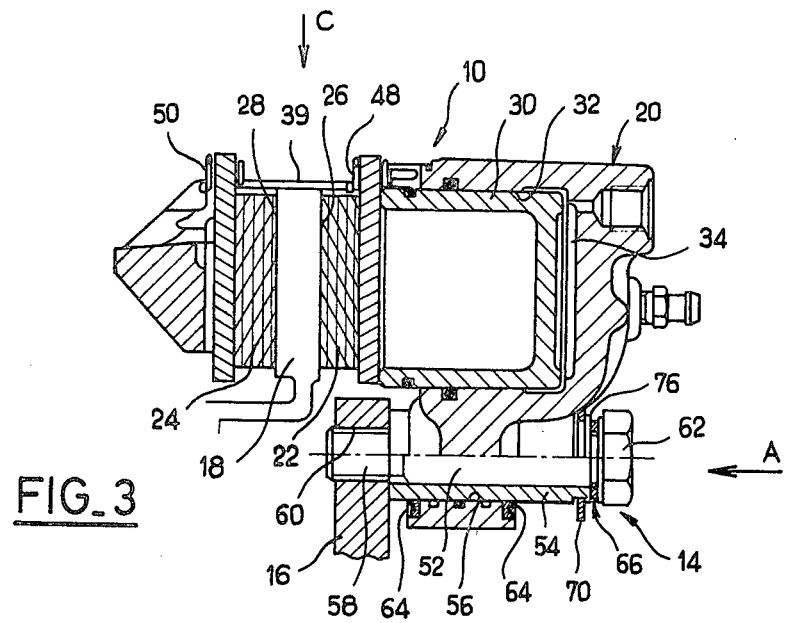
FIG_3
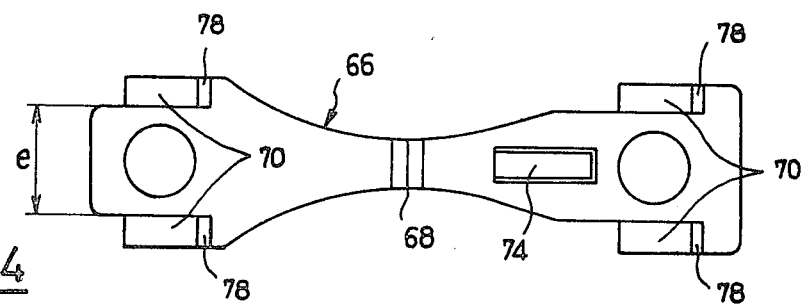
FIG_4
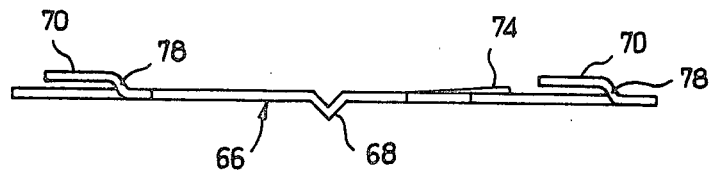
FIG_5
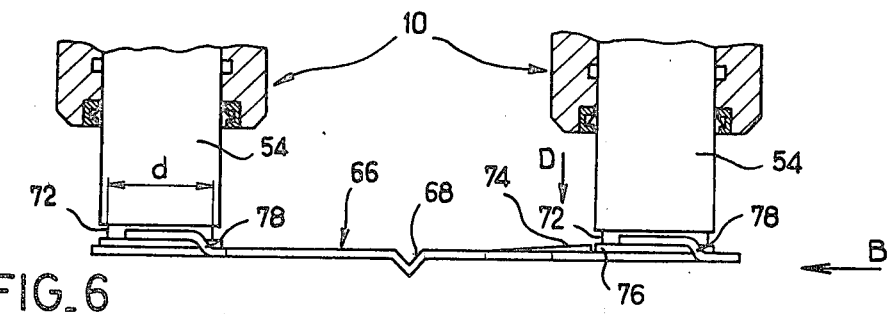
FIG_6

DISC BRAKE INCLUDING A MOVABLE ASSEMBLY

The invention relates to a disc brake for motor vehicles.

The invention more particularly concerns a disc brake of the type including a movable assembly having actuating means capable of urging a first friction element directly and a second friction element by reaction against the corresponding faces of a rotating disc, said movable assembly being mounted to slide by two small columns on a fixed support disposed near the disc, said small columns each having a cylindrical sleeve and also a removable part, one end of which includes a screwthread fixed in a threading formed in the fixed support or in the movable assembly, and the other end of which has a part capable of being forced to rotate by a suitable assembly tool.

In a brake of this type in which the small columns necessarily have little play with respect to the bores in which they are received, clamping of the removable elements can cause rotation of the sleeves and as these are not perfectly centered on the removable parts, the sleeves can act as cams and block the sliding of the movable assembly. Normal operation of the brake is then impossible, only the friction element urged directly by the brake motor can be applied to the disc, and the friction element capable of being applied by reaction is not put in contact with the disc; this causes asymmetric wear on the two friction elements and can also in time cause breaking of the disc, this being thrust upon at one side only.

The subject of the invention is a disc brake which does not have these problems.

To achieve this, the invention proposes a disc brake including a movable assembly having actuating means capable of urging a first friction element directly and a second friction element by reaction against the respective faces of a rotating disc, said movable assembly being mounted to slide by two small columns on a fixed support disposed near the disc, said small columns each having a cylindrical sleeve and also a removable part, one end of which has a screwthread screwed into a threading formed in the fixed support or in the movable assembly and the other end of which has a part capable of being forced to rotate by a suitable assembly tool, a locking element being interposed between said sleeves and said removable parts, said locking element having at least one part with a length which is variable in a direction substantially parallel to the faces of the disc and passing through the axes of each of the small columns, characterized in that said locking element has locking portions cooperating with each of said sleeves and fixing said locking element to said sleeves.

Thus, thanks to the invention, the sleeves are clearly no longer rotated by the removable element, and are consequently no longer capable of locking the movable element; the brake is then able to operate normally.

Another aim of the invention is to render the locking element solid with the sleeve so that the brake must be mounted with said locking element.

A preferred embodiment of the invention will now be described by way of non-limiting example, with reference to the attached figures, in which:

FIG. 1 is a front view of a disc brake made in conformance with the invention;

FIG. 2 is a view from above of the disc brake of FIG. 1;

FIG. 3 is a sectional view at the line 3—3 of the brake of FIG. 1;

FIG. 4 is an enlarged front view of the locking element before it is mounted on the brake;

FIG. 5 is an enlarged view from above of the locking element of FIG. 4; and

FIG. 6 is an enlarged view from above in partial section of the locking element mounted on the sleeves.

FIGS. 1 to 3 show a disc brake including a movable assembly designated by the general reference 10 mounted to slide on two small columns 12 and 14 on a fixed support 16 disposed near the disc 18. The movable assembly 10 has actuating means 20 capable of urging a first friction element 22 directly and a second friction element 24 by reaction against the faces 26 and 28 respectively of the disc 18. In the embodiment represented, the actuating means 20 are constituted by an hydraulic actuator comprising a piston 30 mounted to slide in a blind bore 32 so as to define with the latter a chamber 34 of variable volume to be connected to a pressurized fluid source such as, for example, the master-cylinder of the vehicle (not represented). The actuating means 20 are associated, removably or not, with a C-shaped frame 36, for example, by screws 38. The frame 36 has an opening 39 whose circumferentially spaced edges 40 and 42 receive the friction elements 22 and 24 slidingly and so as to secure them. The edges 40 and 42 of the opening 39 are V-shaped and have notches 44 and 46 allowing radial extraction of the friction elements 22 and 24 respectively. A spring 48, 50 is associated removably with each of the friction elements 22 and 24 respectively, so as to constitute with the latter a sub-assembly removable as a unit from the rest of the brake via the notches 44 and 46.

In the embodiment described, the small columns 12 and 14 are each constituted by a screw 52 bearing a sleeve 54 whose outer surface cooperates with a bore 56 formed in the part of the movable assembly 10 bearing the actuating means 20. Each of the screws 52 is threaded at one end 58, this end 58 being fixed in a threading 60 formed in the fixed support 16. In the embodiment described, each of the screws 52 has at its other end an hexagonal head capable of being forced to rotate by a suitable assembly tool allowing the screws 52 to be fixed in the bores 60. Sleeves 54 are inserted between the heads 62 of the screws 52 and the fixed support 16. Sealing members 64 are associated with the movable assembly 10 so as to ensure protection and lubrication of the surfaces of the bore 56 and the sleeve 54 which are in contact and avoid contaminants penetrating. A locking element 66 constituted by a substantially flat plate connects the small columns 12 and 14. This element 66 is inserted between the heads 62, screws 52 and the sleeves 54. The locking element 66 is shaped like an elongated 8 and is pierced at its two ends to receive the screws 52.

As the axes of the small columns 12 and 14 are not strictly parallel, it is essential to give the element 66 a certain flexibility in a direction which is substantially parallel to the faces 26 and 28 of the disc 18 and passes through the axes of each of the small columns so as to avoid excessive frictional force being produced between the bores 56 and the outer surface of the sleeves 54; this flexibility is given by forming on the element 66 a corrugation 68 perpendicular to the longitudinal direction of this element and substantially at the same distance from each of the small columns 12 and 14. The small columns 12 and 14 are thus able to flex slightly so that their inter-axial distance at the heads is substantially equal to the inter-axial distance of the bores.

With reference to FIGS. 4, 5 and 6, it can be seen that the locking element 66 has elements at each of its ends forming forks 70 formed by cutting and bending of the portions produced integrally with the element 66. As FIG. 6 shows in more detail, these forks 70 engage in grooves 72 formed on each of the sleeves 54, the diameter d of the bottoms of the grooves 72 being slightly smaller than the distance e separating the two arms of the forks 70 so that the forks are easily mounted in the grooves 72. The element 66 also has a resilient portion 74 obtained, as FIGS. 4 and 5 show, by cutting and bending of a tab to the same side as the forks 70. As FIG. 6 shows in greater detail, this resilient portion 74 is opposite a portion 76 of the sleeve 54, this portion 76 being located between the groove 72 and the adjacent end of the sleeve 54.

The brake represented in FIGS. 1 to 3 is mounted in the following way.

The movable element 10 is equipped in advance with the piston 30 and sealing members 64. The sleeves 54 are then mounted in the bores 56 in the direction of Arrow A of FIG. 3. When the ends of the sleeves 54 are approximately in the same plane, the locking element 66 is mounted. With reference to FIG. 6, the element 66 is brought in front of the sleeves in the direction of Arrow B; care is taken that the forks 70 at the two ends of the element 66 enter the grooves 72 formed in each of the sleeves. Continuing movement in the direction of Arrow B of FIG. 6, the resilient portion 74 moves aside because of the portion 76 of the sleeve, which allows the element 66 to be brought into the position represented in FIG. 6. The resilient portion 74 takes up its free position again, as represented in FIGS. 5 and 6, so that it is opposite the portion 76 of the sleeve 54, thus preventing the element 66 from being displaced in the opposite direction to Arrow B. The bent regions 78 of the forks 70 coming into contact with the portion 76 of the sleeves 54 prevent the element 66 from moving in the direction of Arrow B. The screws 52 are then mounted by introducing them into the sleeves 54 through the openings in the locking element 66. The screws 52 are screwed in by means of the heads 62, using a suitable tool (not represented). When the locking element 66 is located between the heads 62 and the sleeves 54, rotation of the heads 62 does not cause rotation of the sleeves 54, thus avoiding a cam effect and blocking of the sliding of the movable assembly. The friction elements are then mounted by introducing them in the direction of Arrow C of FIG. 3 by making the support plates of the friction elements pass through the notches 44 and 46 formed in the frame 36.

The brake is removed by the reverse order of the operation described hereinbefore, except that removal of the element 66 from the sleeves 54 necessitates exerting a force in the direction of Arrow D of FIG. 6 on the resilient portion 74 until this resilient portion moves aside and allows the element 66 to slide in the direction opposite to Arrow B.

In the preceding description, the element 66 clearly prevents rotation of the sleeves 54 when the screws 52 are put in position, thus avoiding any risk of locking the movable element on its small columns. The fork portions 70 and the resilient portion 74 fix the locking element 66 and the sleeve 54 so that the risk of losing the element 66 is removed. In addition, removal of the brake by unscrewing the screws 52 does not necessitate removal of the locking element 66.

We claim:

1. A disc brake including a movable assembly having actuating means capable of urging a first friction element directly and a second friction element by reaction against the respective faces of a rotating disc, said movable assembly being mounted to slide by two small columns on a fixed support disposed near the disc, said small columns each having a cylindrical sleeve and a removable part, each sleeve having a groove and each removable part having one end of which has a screw thread secured in a threading formed in the fixed support and the other end of which has a part capable of being rotated by a suitable assembly tool, a locking element comprising a substantially flat plate being interposed between said sleeves and removable parts, said locking element having at least one part with a length which is variable in a direction substantially parallel to the faces of the disc and passing through the axes of each of the small columns, the locking element having locking portions forming forks each engaging the groove of an adjacent end of a sleeve and fixing said locking element to said sleeves, and the forks directed in said direction which is substantially parallel to the plane of the disc and passing through the axes of the small columns.

2. The disc brake according to claim 1, characterized in that the locking element has a resilient portion capable of moving aside when the forks are mounted in said grooves, one part of the resilient portion cooperating with a portion of one of said sleeves located between an end of the resilient portion and one of said grooves so as to prevent the forks from disengaging from said grooves.

3. The disc brake according to claim 2, characterized in that said forks and resilient portion are formed by cutting and bending of portions produced integrally with the substantially flat plate forming said locking element.

* * * * *